US012620662B2

(12) United States Patent
Yang et al.

(10) Patent No.: US 12,620,662 B2
(45) Date of Patent: May 5, 2026

(54) BATTERY PACK, VEHICLE, AND ENERGY STORAGE SYSTEM

(71) Applicant: LG ENERGY SOLUTION, LTD., Seoul (KR)

(72) Inventors: Chang-Hyeon Yang, Daejeon (KR); Hae-Jin Kim, Daejeon (KR); Byung-Do Jang, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 657 days.

(21) Appl. No.: 18/017,623

(22) PCT Filed: Jan. 27, 2022

(86) PCT No.: PCT/KR2022/001528
§ 371 (c)(1),
(2) Date: Jan. 23, 2023

(87) PCT Pub. No.: WO2022/169207
PCT Pub. Date: Aug. 11, 2022

(65) Prior Publication Data
US 2023/0299406 A1      Sep. 21, 2023

(30) Foreign Application Priority Data
Feb. 5, 2021     (KR) ........................ 10-2021-0017092

(51) Int. Cl.
*H01M 50/242*        (2021.01)
*B60L 50/64*         (2019.01)
(Continued)

(52) U.S. Cl.
CPC ........... *H01M 50/242* (2021.01); *B60L 50/64* (2019.02); *H01M 50/211* (2021.01);
(Continued)

(58) Field of Classification Search
None
See application file for complete search history.

(56) References Cited

U.S. PATENT DOCUMENTS 11,018,392 B2    5/2021  Wuensche et al.
11,075,423 B2    7/2021  Wuensche et al.
(Continued)

FOREIGN PATENT DOCUMENTS

CN        208478441  U     2/2019
EP        4 195 371  A2    6/2023
(Continued)

OTHER PUBLICATIONS

International Search Report for PCT/KR2022/001528 (PCT/ISA/210) mailed on May 18, 2022.
(Continued)

*Primary Examiner* — Wyatt P McConnell
(74) *Attorney, Agent, or Firm* — Birch, Stewart, Kolasch & Birch, LLP

(57)          ABSTRACT

The battery pack includes at least one battery module having a plurality of battery cells; a pack tray having a module mounting portion configured to mount one or more of the battery modules and extending in a horizontal direction, and a side cover portion extending upwardly from an outer periphery of the module mounting portion to cover a side of the battery module; and at least one side plate coupled to any one or more of the module mounting portion and the side cover portion, provided on one or both sides of the battery module, having a plurality of through-holes, and configured to block at least one surface of the battery module when the battery module is expanded.

11 Claims, 12 Drawing Sheets

(51) Int. Cl.

| | |
|---|---|
| *H01M 50/211* | (2021.01) |
| *H01M 50/262* | (2021.01) |
| *H01M 50/271* | (2021.01) |
| *H01M 50/291* | (2021.01) |

(52) U.S. Cl.
CPC ....... *H01M 50/262* (2021.01); *H01M 50/271* (2021.01); *H01M 50/291* (2021.01)

(56) References Cited

U.S. PATENT DOCUMENTS

| | | | |
|---|---|---|---|
| 11,183,729 | B2 | 11/2021 | He et al. |
| 2012/0270095 | A1 | 10/2012 | Kim |
| 2013/0143082 | A1 | 6/2013 | Kim |
| 2015/0140406 | A1 | 5/2015 | Kim et al. |
| 2016/0172715 | A1 | 6/2016 | Ju et al. |
| 2018/0013110 | A1 | 1/2018 | Wuensche et al. |
| 2020/0083502 | A1 | 3/2020 | Fan et al. |
| 2020/0127349 | A1 | 4/2020 | Park et al. |
| 2020/0176733 | A1 | 6/2020 | Kim et al. |
| 2021/0296727 | A1* | 9/2021 | Ju ........................ H01M 50/233 |

FOREIGN PATENT DOCUMENTS

| | | | |
|---|---|---|---|
| JP | 11-95983 | A | 4/1999 |
| JP | 531354882 | B2 | 10/2013 |
| JP | 2015-28937 | A | 2/2015 |
| JP | 2019-525398 | A | 9/2019 |
| JP | 2020-87912 | A | 6/2020 |
| JP | 2021-7090 | A | 1/2021 |
| JP | 2022-500824 | A | 1/2022 |
| KR | 10-1252935 | B1 | 4/2013 |
| KR | 10-1256058 | B1 | 4/2013 |
| KR | 10-2013-0061375 | A | 6/2013 |
| KR | 10-2015-0057261 | A | 5/2015 |
| KR | 10-1693338 | B1 | 1/2017 |
| KR | 10-1909215 | B1 | 10/2018 |
| KR | 10-2019-0048616 | A | 5/2019 |
| KR | 10-2019-0092835 | A | 8/2019 |
| KR | 10-2020-0044580 | A | 4/2020 |
| KR | 10-2122921 | B1 | 6/2020 |
| KR | 10-2020-0080406 | A | 7/2020 |
| WO | 2018/230390 | A1 | 12/2018 |
| WO | 2020/143178 | A1 | 7/2020 |

OTHER PUBLICATIONS

Extended European Search Report for European Patent Application No. 22 74 9957, dated Sep. 12, 2024.

* cited by examiner

FIG. 15

BATTERY PACK, VEHICLE, AND ENERGY STORAGE SYSTEM

TECHNICAL FIELD

The present disclosure relates to a battery pack, a vehicle and an energy storage system, and more specifically, to a battery pack capable of suppressing swelling of a battery cell and effectively increasing durability.

The present application claims priority to Korean Patent Application No. 10-2021-0017092 filed on Feb. 5, 2021 in the Republic of Korea, the disclosures of which are incorporated herein by reference.

BACKGROUND ART

As the demand for portable electronic products such as laptops, video cameras, and mobile phones has rapidly increased in recent years and the development of electric vehicles, energy storage batteries, robots, and satellites has begun in earnest, research on high-performance secondary batteries capable of repeated charge/discharge has been actively conducted.

Currently commercialized secondary batteries include nickel cadmium batteries, nickel hydride batteries, nickel zinc batteries, and lithium secondary batteries. Among them, lithium secondary batteries are in the spotlight because they have almost no memory effect compared to nickel-based secondary batteries, and thus have advantages of free charge/discharge, very low self-discharge rate, and high energy density.

Such a lithium secondary battery mainly uses a lithium-based oxide and a carbon material as a positive electrode active material and a negative electrode active material, respectively. In addition, the lithium secondary battery includes an electrode assembly in which a positive electrode plate and a negative electrode plate coated with the positive electrode active material and the negative electrode active material, respectively are disposed with a separator interposed therebetween, and a casing, that is, a battery case, for sealing and accommodating the electrode assembly along with an electrolyte.

Additionally, depending on the shape of a casing, lithium secondary batteries may be classified into a can-type secondary battery in which an electrode assembly is embedded in a metal can, and a pouch-type secondary battery in which an electrode assembly is embedded in a pouch of an aluminum laminate sheet.

In particular, recently, moving means or moving devices that move by the rotational force of an electric motor operated by receiving power from a battery pack have been increasing. The demand for battery packs applied to such moving means and moving devices is also increasing.

Since it is desirable to manufacture battery modules of medium and large sizes as small as possible in size and weight, a prismatic battery and a pouch-type secondary battery that may be charged with high integration and have a small weight to capacity are mainly used as battery cells for battery modules of medium and large sizes.

FIG. 1 is a perspective view schematically showing a state of a cell assembly having a plurality of pouch-type secondary batteries of the related art.

Referring to FIG. 1, the pouch-type secondary battery 11 is easily applied to various types of storage spaces by virtue of its advantages such as small weight and low manufacturing cost by applying an aluminum laminate sheet or the like as an external case, and easy deformation of shape in that the external case is composed of a flexible material. In addition, the pouch-type secondary battery 11 may be provided with electrode leads 11a at both ends in the front-rear direction, respectively. Also, when forming the cell assembly 12 by stacking a plurality of pouch-type secondary batteries 11 in close contact with each other to manufacture a battery module, space utilization is high, and thus the battery module may have a high energy density (directivity) per volume.

However, since such a battery module has pouch-type secondary batteries 11 capable of charge/discharge therein, a lot of heat is inevitably generated during the charge/discharge process of the battery module, and in the pouch-type secondary batteries 11 exposed to such high temperature, the electrolyte is partially vaporized or a side reaction occurs, so that a large amount of gas is generated therein. Thus, a swelling phenomenon that the volume of the pouch-type secondary batteries 11 expands occurs.

FIGS. 2 and 3 are front views schematically showing the swelling (volume expansion) of a battery module accommodating a cell assembly of the related art therein.

As shown in FIGS. 2 and 3 along with FIG. 1, when the above-described swelling occurs in the battery module 10 of the related art, the overall size of the cell assembly 12 configured by stacking the pouch-type secondary batteries 11 is expanded to press the inner surface of the module case 20 outward. Due to this pressing force, deformation such as a portion of the module case 20 protruding to the outside occurred. Moreover, as described above, when the module case 20 does not effectively block the volume expansion of the cell assembly 12, the swelling is not suppressed, and thus more gas is generated in the pouch-type secondary batteries 11, resulting in more serious problem such as leakage of electrolyte.

DISCLOSURE

Technical Problem

The present disclosure is designed to solve the problems of the related art, and therefore the present disclosure is directed to providing a battery pack capable of effectively suppressing swelling of a battery cell and effectively increasing durability. These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

In one aspect of the present disclosure, there is provided a battery pack including:

at least one battery module having a plurality of battery cells;

a pack tray having a module mounting portion configured to mount the at least one battery module and extending in a horizontal direction, and a side cover portion extending upwardly from an outer periphery of the module mounting portion to cover a side of the at least one battery module; and at least one side plate coupled to at least one of the module mounting portion and the side cover portion, provided on at least one side of the at least one battery module, having a plurality of through-holes, and configured to block at least one surface of the at least one battery module when the at least one battery module is expanded.

In addition, the at least one battery module may further include an upper cover extending in the horizontal direction to cover an upper portion of the at least one battery module and configured to be partially coupled to an upper end of the at least one side plate, and a lower portion of the at least one side plate may be coupled to the module mounting portion.

Further, a plurality of first fastening grooves and a plurality of first bolt holes formed at positions facing each other may be formed in the at least one side plate and the upper cover, respectively.

Moreover, a lower end of the at least one side plate may have a plurality of second fastening grooves inserted into a predetermined depth, and the module mounting portion may have a plurality of second bolt holes formed at positions facing the plurality of second fastening grooves.

In addition, a lower end of the at least one side plate may have a plurality of fixing grooves extending upwardly a predetermined depth, and the module mounting portion may have a plurality of fixing protrusions that extend into a respective one of the plurality of fixing grooves and are configured to prevent the at least one side plate from moving toward the at least one battery module.

Moreover, the plurality of fixing protrusions may be configured such that the thickness thereof gradually increases in a direction extending away from the at least one battery module.

In addition, the pack tray may include a plurality of support protrusions respectively inserted into a plurality of through-holes formed in the at least one side plate and configured to support the at least one side plate toward the at least one battery module.

Also, each of the plurality of support protrusions may gradually increase in thickness in a direction extending away from the at least one battery module.

In another aspect of the present disclosure, a cross section of each of the plurality of through holes may have a honeycomb shape.

A vehicle according to the present disclosure for achieving the above object includes at least one battery pack.

An energy storage system according to the present disclosure for achieving the above object includes at least one battery pack.

Advantageous Effects

According to an aspect of the present disclosure, the battery pack of the present disclosure includes at least one side plate configured to block at least one surface of the battery module, and thus it is possible to effectively prevent a change in volume at one or both sides of the battery module when the swelling of the plurality of battery cells located inside the battery module occurs, thereby suppressing the intensification of swelling and preventing the battery module from being deformed. Ultimately, the present disclosure may effectively increase the durability of the battery pack.

According to another aspect of the present disclosure, a plurality of fixing grooves are formed at the lower end of the side plate and the module mounting portion includes a plurality of fixing protrusions configured to prevent the side plate from moving in an outward direction, so that the side plate may be stably fixed on the module mounting portion. Moreover, the side plate may prevent the side plate from moving in the left direction (negative direction of the X-axis) to prevent deformation of the battery module. Accordingly, the battery pack of the present disclosure may effectively increase durability.

According to still another aspect of the present disclosure, a plurality of support protrusions are formed in the pack tray and the plurality of support protrusions are configured to be inserted into a plurality of through-holes formed in the side plate, and thus it is possible to effectively prevent the side plate from moving in an outward direction by the male and female coupling structure of the through-hole and the support protrusion when the volume expansion of the battery module occurs, thereby suppressing the volume expansion of the battery module.

In addition, the plurality of support protrusions have a shape in which the thickness thereof gradually increases in an outward direction (swelling direction). Thus, like a coupling structure in which a wedge is embedded in a groove, the more the side plate is pressed outward, the tighter the support protrusion is fitted into the through-hole of the side plate, thereby blocking the movement of the side plate with a greater force.

DESCRIPTION OF DRAWINGS

The accompanying drawings illustrate a preferred embodiment of the present disclosure and together with the foregoing disclosure, serve to provide further understanding of the technical features of the present disclosure, and thus the present disclosure is not construed as being limited to the drawings.

FIG. 15 is a side view schematically showing a vehicle according to an embodiment of the present disclosure.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Figure 1:
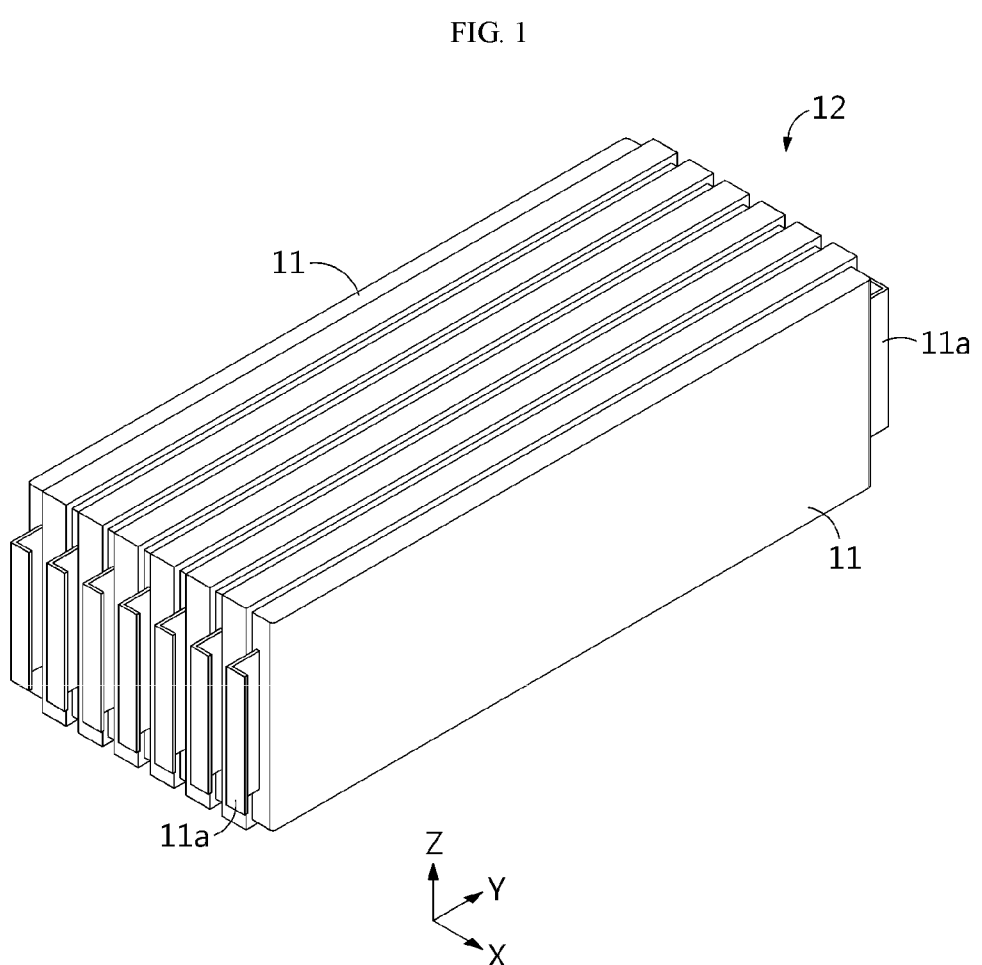
FIG. 1 is a perspective view schematically showing a cell assembly having a plurality of pouch-type secondary batteries of the related art.
Figure 2:
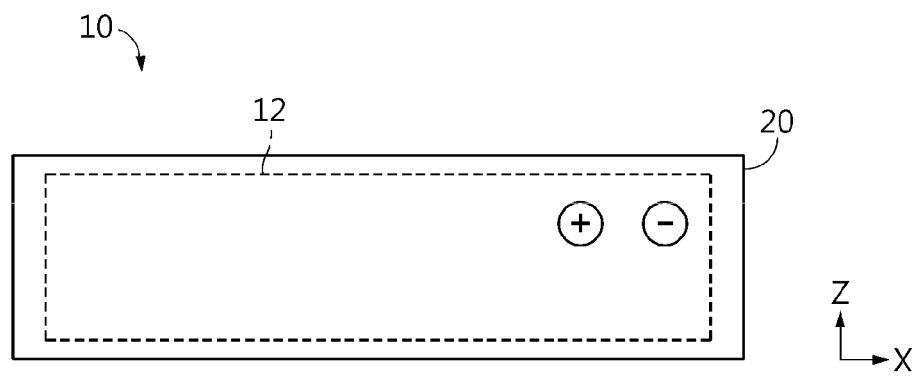
FIGS. 2 and 3 are front views schematically showing the swelling (volume expansion) of a battery module accommodating a cell assembly of the related art therein.
Figure 3:
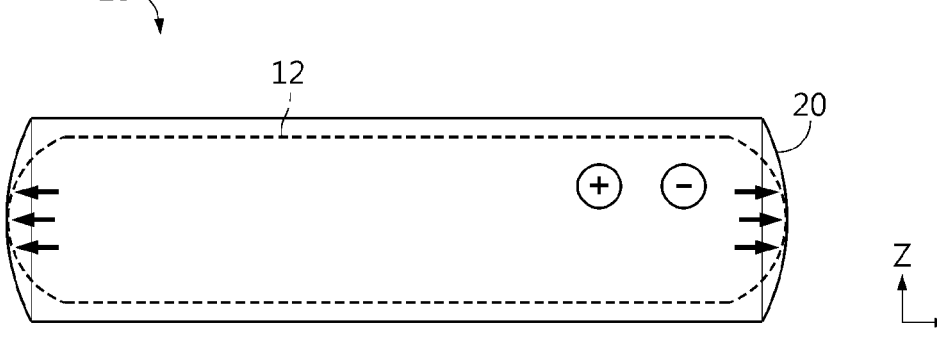
Figure 4:
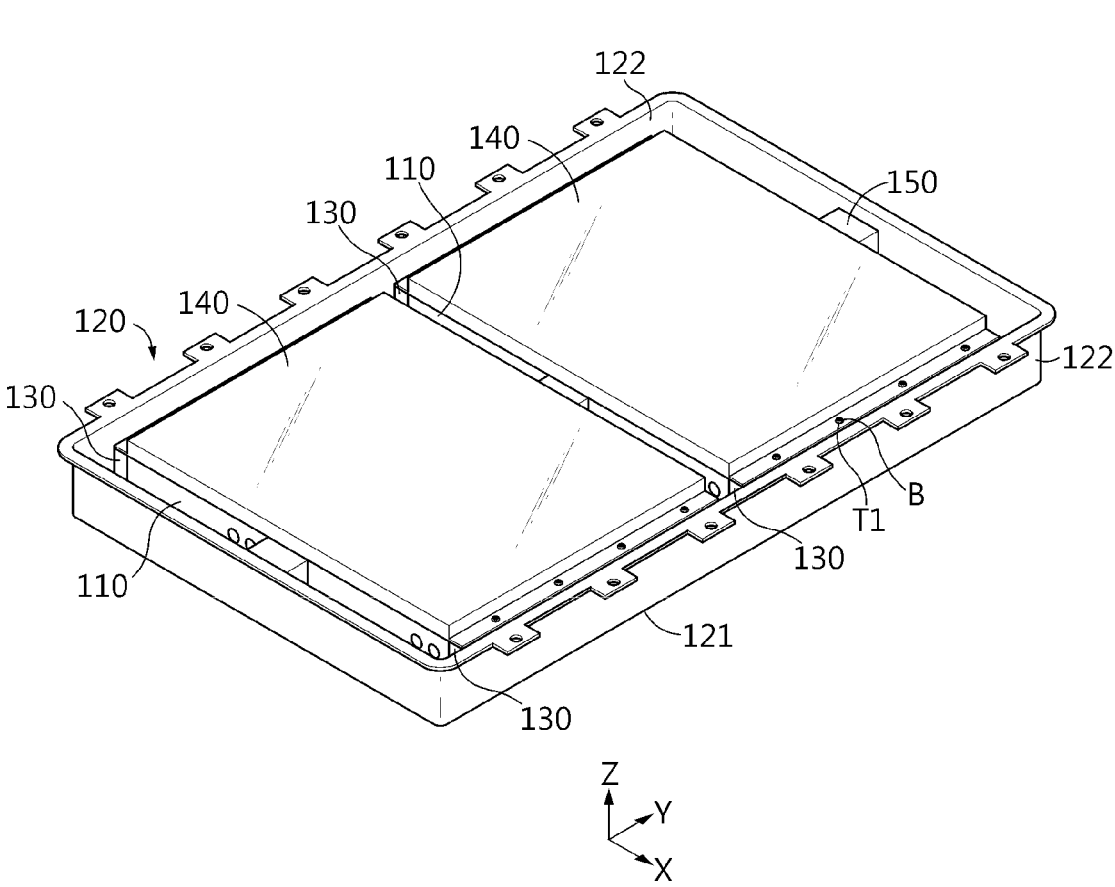
FIG. 4 is a perspective view schematically showing a battery pack according to an embodiment of the present disclosure.
Figure 5:
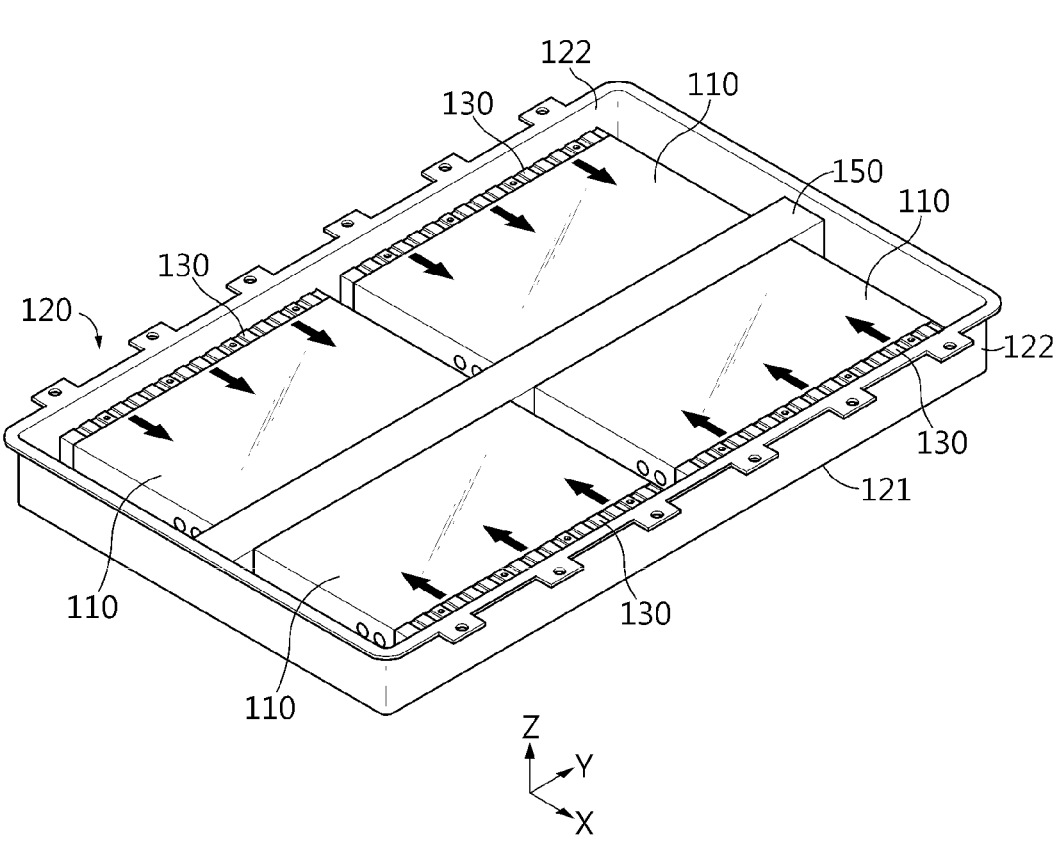
FIG. 5 is a perspective view schematically showing some configurations of a battery pack according to an embodiment of the present disclosure.

FIG. 4 is a perspective view schematically showing a battery pack according to an embodiment of the present disclosure. And, FIG. 5 is a perspective view schematically showing some configurations of a battery pack according to an embodiment of the present disclosure. For reference, in the drawings, the X-axis indicates a right and a left directions, the Y-axis indicates a rear and a front directions, and the Z-axis indicates an upward and a downward directions.

Referring FIGS. 4 and 5, the battery pack 100 according to an embodiment of the present disclosure includes at least one battery module 110, a pack tray 120, and at least one side plate 130.

Specifically, the battery module 110 may include a plurality of battery cells (not shown). The plurality of battery cells, for example, may be arranged in a stacked form in the left-right direction (X-axis direction). More specifically, the battery cell may be a pouch-type secondary battery. For example, the plurality of battery cells may include an electrode assembly, an electrolyte, an electrode lead, a pouch case, and the like. The pouch case may be configured to accommodate the electrode assembly therein. Also, the pouch case may be sealed so that an external material is not introduced therein. In addition, the pouch case may be provided with a flexible material so that the shape may be deformed according to the internal pressure when a gas is generated due to a side reaction during charge/discharge of the battery cell. For example, although not illustrated, the pouch case may be a laminate sheet in which an inner sealant layer, a metal foil barrier layer, and an outer insulating layer are sequentially stacked in an order from the inside to the outside.

Since such a pouch-type secondary battery is a generally known technology, a detailed description of the configurations of the pouch-type secondary battery will be omitted. However, the battery cell of the present disclosure is not necessarily limited to the pouch-type secondary battery only, and as long as a battery cell capable of volume expansion (swelling) during charge/discharge, other forms or types of battery cells may also be applied.

In addition, the pack tray 120 may include a module mounting portion 121 and a side cover portion 122. Specifically, the module mounting portion 121 may be configured to mount at least one battery module 110. For example, as shown in FIG. 4, four battery modules 110 may be mounted on the module mounting portion 121 of the pack tray 120. The battery pack 100 may further include a cross beam 150. The cross beam 150 may have a shape extending in the front-rear direction (Y-axis direction). The cross beam 150 may be fixed in position while being mounted on the pack tray 120 by a bolt fastening method. Also, the cross beam 150 may be positioned to be interposed between battery modules 110. That is, the cross beam 150 may serve to support one side (right side) or the other side (left side) of the battery module 110.

The module mounting portion 121 may have a plate shape extending in a horizontal direction (X-axis direction, Y-axis direction) to form a bottom of the pack tray 120. Here, the "horizontal direction" may be any one direction parallel to the ground. The pack tray 120 may include a metal having excellent mechanical rigidity. The side cover portion 122 may be configured to cover a side portion of the battery module 110. For example, as shown in FIG. 5, the side cover portion 122 may be configured to cover the front, rear, left, and right sides of the battery module 110. The side cover portion 122 may be a portion extending in the upward direction (Z-axis direction) from an outer periphery of the module mounting portion 121. The side cover portion 122 may be extended along the outer periphery (edge) of the module mounting portion 121.

Figure 6:
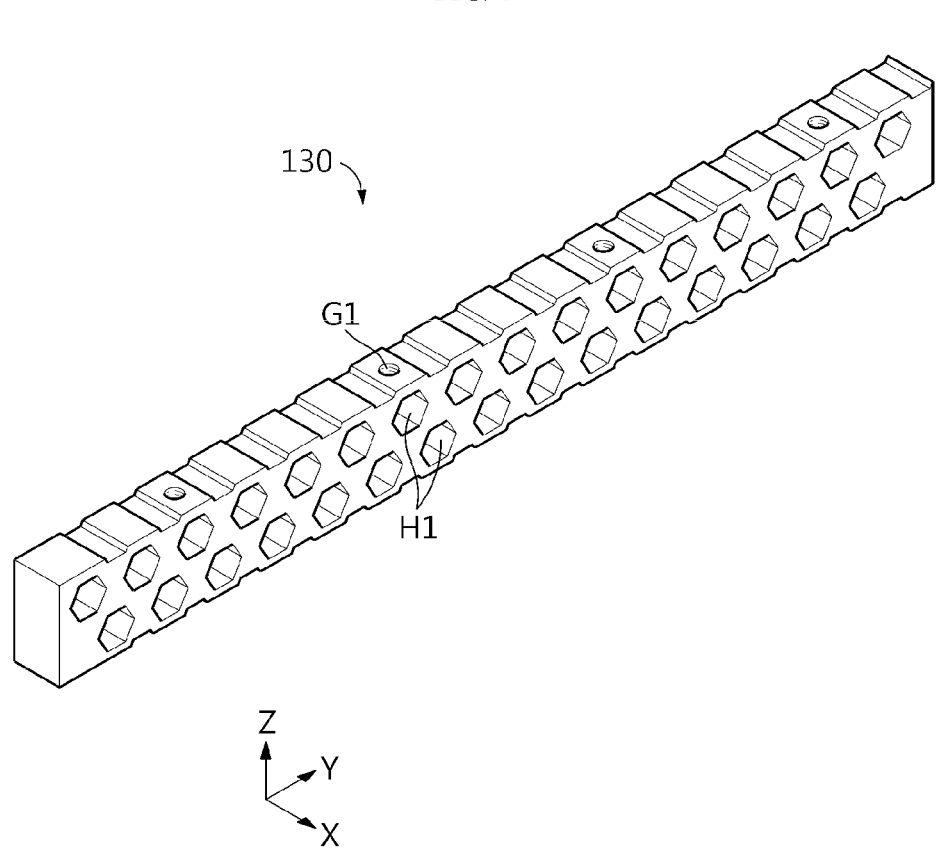
FIG. 6 is a perspective view schematically showing a side plate of a battery pack according to an embodiment of the present disclosure.

FIG. 6 is a perspective view schematically showing a side plate of a battery pack according to an embodiment of the present disclosure. And, FIG. 7 is a bottom perspective view schematically showing a side plate of a battery pack according to an embodiment of the present disclosure.

Figure 7:
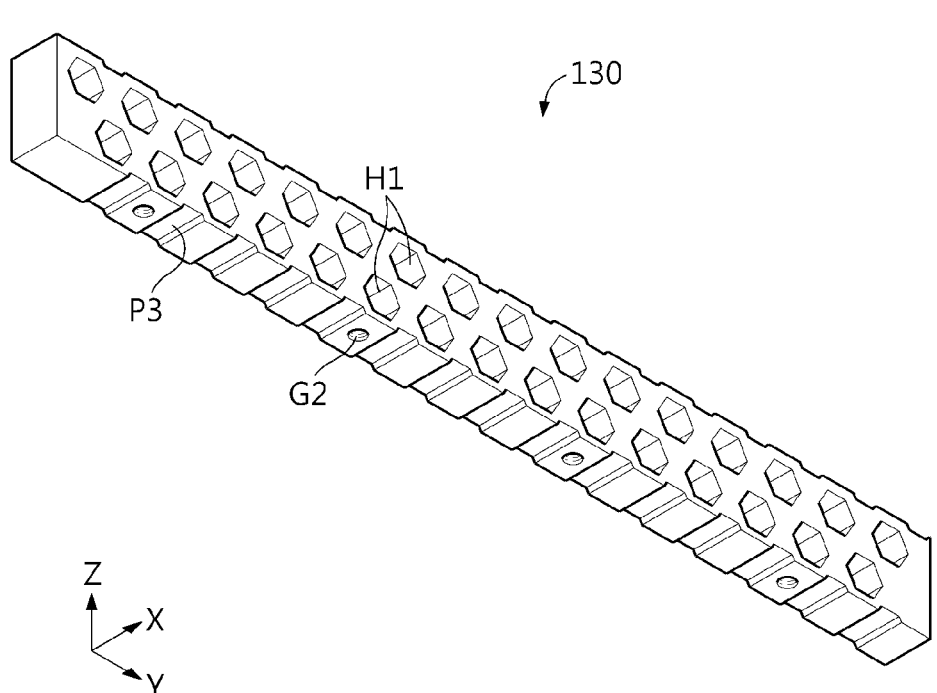
FIG. 7 is a bottom perspective view schematically showing a side plate of a battery pack according to an embodiment of the present disclosure.

Referring to FIGS. 6 and 7 along with FIG. 5, the side plate 130 may be configured to block at least one surface of the battery module 110 when the battery module 110 is expanded. The side plate 130 may be provided on one side (right or left) or both sides (left and right) of the battery module 110. For example, as shown in FIG. 5, the battery pack 100 of the present disclosure may include four side plates 130. The four side plates 130 may be provided on the left or right side of each of the four battery modules 110.

For example, the side plate 130 may be fixed in position in a state in close contact with one side of the battery module 110. The side plate 130 may have a plurality of through-holes H1 formed therein. For example, the through-hole H1 may have a honeycomb shape in a vertical cross-section. Accordingly, since a plurality of honeycomb-shaped through-holes H1 are formed in the side plate 130 of the present disclosure, the side plate 130 of the present disclosure may have excellent mechanical rigidity compared to the side plate 130 having the same material and the same weight in which a plurality of circular through-holes H1 are formed. In particular, by the honeycomb-shaped through-hole H1 structure, it is possible to impart deformation resistance of the through-hole H1 in the penetration direction (X-axis direction) to the side plate 130, and thus deformation of the battery module 110 may be suppressed with a greater force when the swelling of the battery module 110 occurs. In addition, according to such a honeycomb shape, it is possible to have high resistance to temperature change, heat, torsion, and external compression.

For example, since the side plate 130 having a honeycomb shape has a larger surface area than a conventional side plate, it is effective to dissipate heat generated in the pouch-type secondary battery 11 to the outside. That is, the side plate 130 according to an embodiment of the present disclosure has an advantage in terms of heat dissipation.

In addition, the side plate 130 may be manufactured through extrusion method. Specifically, the method of manufacturing the side plate 130 may include the steps of manufacturing a metal base material by extruding long in the penetration direction (X-axis direction) of the through-hole H1 to form the plurality of through-holes H1 in the side plate 130, and manufacturing the plurality of side plates 130 by vertically cutting the metal base material at every predetermined distance in the penetration direction (X-axis direction). Accordingly, the side plate 130 of the battery pack 100 of the present disclosure is manufactured through extrusion method, and thus it has excellent mechanical rigidity and simple manufacturing process compared to press manufacturing or mold forming manufacturing methods, so that it is possible to manufacture multiple side plates 130 in a short time, thereby increasing the efficiency of manufacturing process of the battery pack 100. That is, according to this method, mass production of the side plate 130 is possible.

Further, the side plate 130 may include an aluminum alloy material. For example, the side plate 130 with an aluminum alloy material may have better mechanical rigidity when compared with the side plate 130 with a steel material having the same weight.

In addition, the side plate 130 may be coupled to any one or more of the module mounting portion 121 and the side cover portion 122. For example, the side plate 130 may be mechanically coupled to any one or more of the module mounting portion 121 and the side cover portion 122. For example, the coupling method may include welding, male and female coupling fastening, or coupling by a separate fixing member. This will be described in more detail in the following description.

Therefore, according to this configuration of the present disclosure, the present disclosure includes at least one side plate 130 configured to block at least one surface of the battery module 110, and thus it is possible to effectively prevent a change in volume at one or both sides of the battery module 110 when the swelling of the plurality of battery cells located inside the battery module 110 occurs, thereby suppressing the intensification of swelling and preventing the battery module 110 from being deformed. Ultimately, the present disclosure may effectively increase the durability of the battery pack 100.

Referring to FIGS. 4 to 7 again, the battery module 110 of the present disclosure may further include an upper cover 140. The upper cover 140 may have a plate shape extending in a horizontal direction to cover an upper portion of the battery module 110. The upper cover 140 may be configured such that a portion thereof is coupled to an upper end of the side plate 130. The edge portion of the upper cover 140 may be welded or bolted to the upper end of the side plate 130. For example, each of the left and right ends of the upper cover 140 may be bolted to the side plate 130 located on the left side and the side plate 130 located on the right side, respectively.

Moreover, the side plate 130 may have a lower portion coupled to the module mounting portion 121. The lower portion of the side plate 130 may be welded or bolted to the module mounting portion 121.

Therefore, according to this configuration of the present disclosure, the present disclosure includes the upper cover 140 coupled to an upper portion of the side plate 130, thereby stably fixing the position of the side plate 130 so that the side plate 130 may prevent the battery module 110 from being deformed. Moreover, since the lower portion of the side plate 130 is coupled to the module mounting portion 121 of the pack tray 120 in the present disclosure, it is possible to stably fix the position of the side plate 130 so that the side plate 130 may prevent the battery module 110 from being deformed. Ultimately, the present disclosure may effectively increase the durability of the battery pack 100.

Referring to FIGS. 6 and 7 along with FIG. 4, the side plate 130 may have a plurality of first fastening grooves G1 and second fastening grooves G2 formed in the upper and lower portions thereof, respectively. The first fastening groove G1 may have a space inserted to a predetermined depth. A screw thread may be formed in the inserted space. That is, a screw bolt B may be inserted into the first fastening groove G1 to fix the end of the screw bolt B. In the upper cover 140, a plurality of first bolt holes T1 may be formed at positions facing each of the plurality of first fastening grooves G1. The first bolt hole T1 may be configured such that the body of the screw bolt B passes therethrough. Also, the head of the screw bolt B may be coupled to the peripheral portion of the first bolt hole T1. That is, the screw bolt B may be inserted into the first bolt hole T1 of the upper cover 140, and the lower end of the screw bolt B may be inserted into the first fastening groove G1 formed at the upper end of the side plate 130 to be screw-coupled. In other words, the side plate 130 and the upper cover 140 may be bolted together.

Therefore, according to this configuration of the present disclosure, the first fastening groove G1 of the side plate 130 and the first bolt hole T1 of the upper cover 140 are bolted to each other in the present disclosure, so that the side plate 130 may be stably fixed in position, whereby the side plate 130 may effectively prevent the battery module 110 from being deformed.

Figure 8:
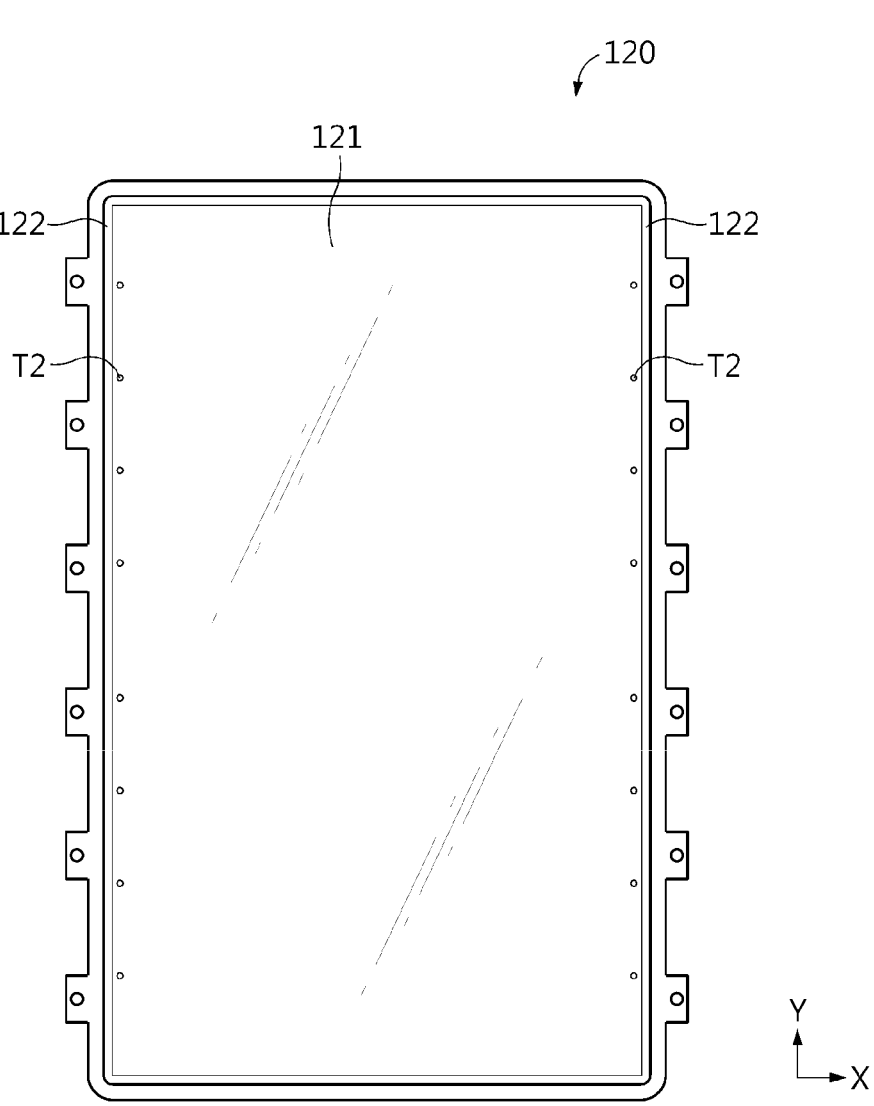
FIG. 8 is a plan view schematically showing a pack tray of a battery pack according to an embodiment of the present disclosure.

FIG. 8 is a plan view schematically showing a pack tray of a battery pack according to an embodiment of the present disclosure. And, FIG. 9 is a partial vertical cross-sectional view schematically showing a portion of a battery pack according to an embodiment of the present disclosure.

Figure 9:
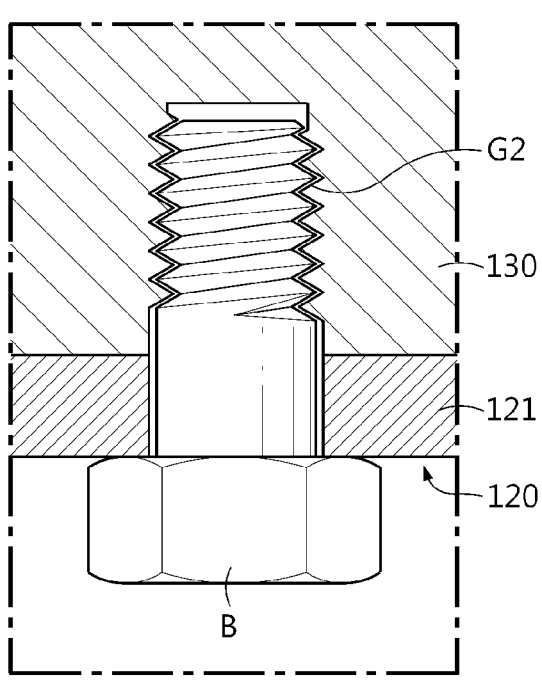
FIG. 9 is a partial vertical cross-sectional view schematically showing a portion of a battery pack according to an embodiment of the present disclosure.

Referring to FIGS. 8 and 9 along with FIGS. 6 and 7 again, the second fastening groove G2 may have a space inserted to a predetermined depth. A screw thread may be formed in the inserted space of the second fastening groove G2. That is, the screw bolt B may be inserted into the second fastening groove G2 to fix the end of the screw bolt B. In the module mounting portion 121 of the pack tray 120, a plurality of second bolt holes T2 may be formed at positions facing each of the plurality of second fastening grooves G2. The second bolt hole T2 may be configured such that the body of the screw bolt B passes therethrough. Also, the head of the screw bolt B may be coupled to the peripheral portion of the second bolt hole T2. That is, the screw bolt B may be inserted into the second bolt hole T2 of the module mounting portion 121, and the lower end of the screw bolt B may be inserted into the second fastening groove G2 formed at the lower end of the side plate 130 to be screw-coupled. In other words, the side plate 130 and the module mounting portion 121 of the pack tray 120 may be bolted together.

Therefore, according to this configuration of the present disclosure, the second fastening groove G2 of the side plate 130 and the second bolt hole T2 of the module mounting portion 121 of the pack tray 120 are bolted to each other in the present disclosure, so that the side plate 130 may be stably fixed in position, whereby the side plate 130 may effectively prevent the battery module 110 from being deformed.

Figure 10:
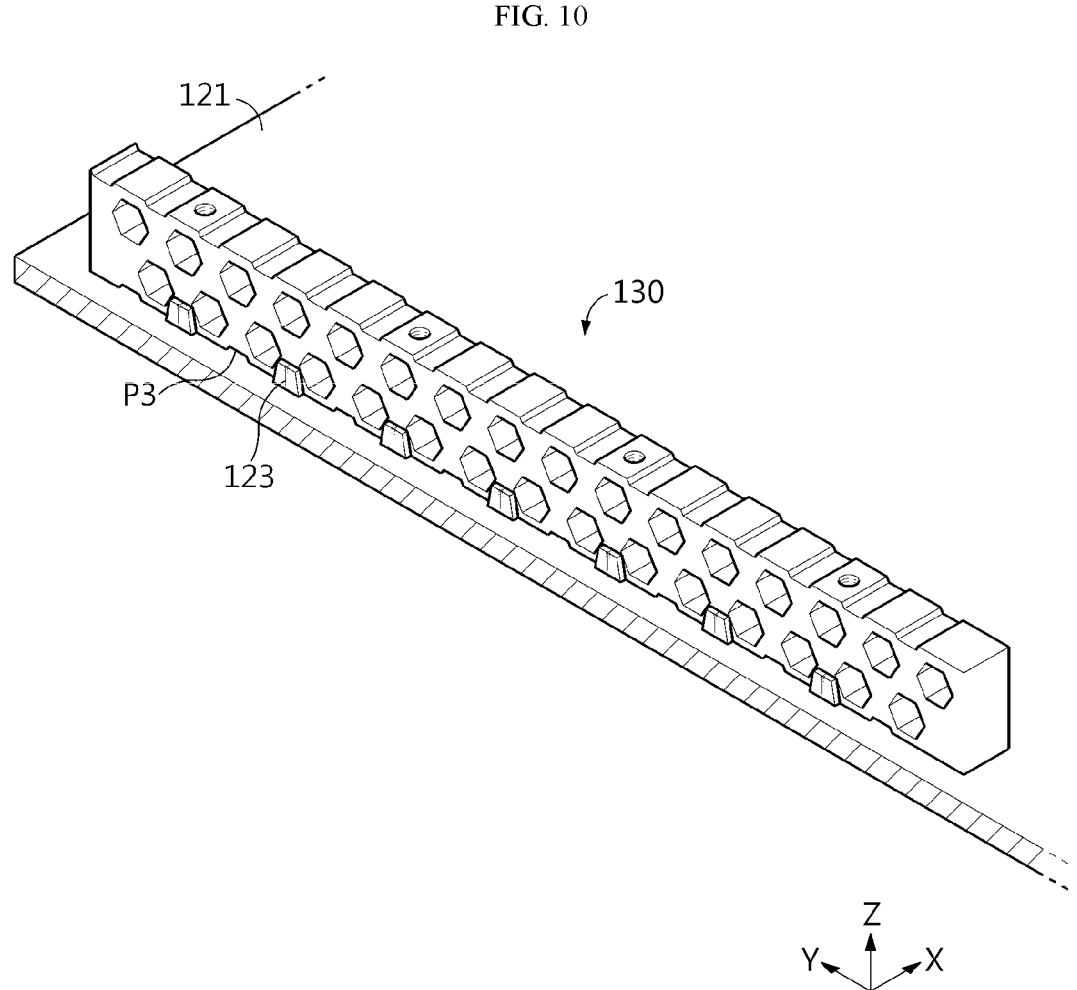
FIG. 10 is a partial perspective view schematically showing some configurations of a battery pack according to an embodiment of the present disclosure.
Figure 11:
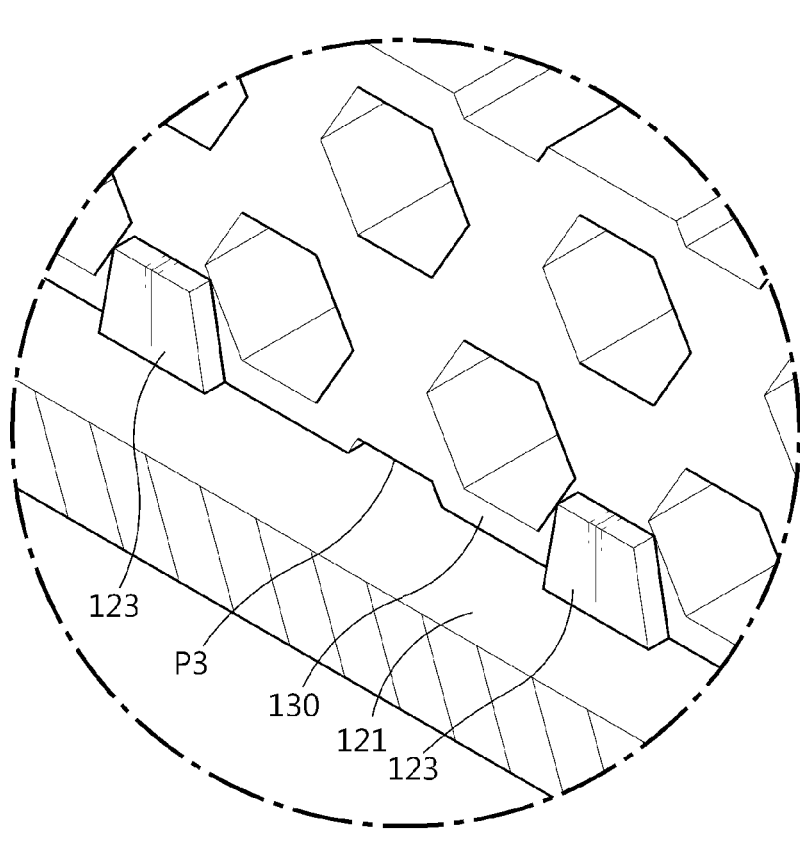
FIG. 11 is a partial enlarged view schematically showing a state in which a partial region of FIG. 10 is greatly enlarged.

FIG. 10 is a partial perspective view schematically showing some configurations of a battery pack according to an embodiment of the present disclosure. FIG. 11 is a partial enlarged view schematically showing a state in which a partial region of FIG. 10 is greatly enlarged. And, FIG. 12 is a partial perspective view schematically showing a portion of a pack tray of a battery pack according to another embodiment of the present disclosure.

Figure 12:
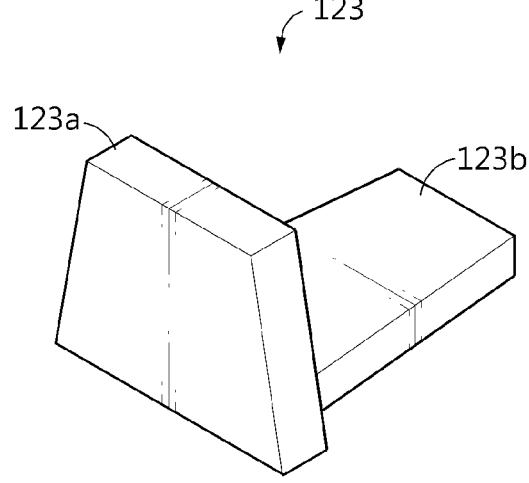
FIG. 12 is a partial perspective view schematically showing a portion of a pack tray of a battery pack according to another embodiment of the present disclosure.

Referring to FIGS. 10 to 12 along with FIGS. 5 and 7, the battery pack 100 according to another embodiment of the present disclosure may not have a second bolt hole T2 compared to the pack tray 120 of the battery pack 100 in FIG. 4. Instead, a plurality of fixing protrusions 123 may be formed in the pack tray 120 of the battery pack 100 in FIG. 10. The other configurations are the same as those of the battery pack 100 in FIG. 4, and thus description of the other configurations will be omitted.

In the side plate 130 of the battery pack 100 in FIG. 10, a plurality of fixing grooves P3 inserted to a predetermined depth in the upper direction may be formed at the lower end thereof. The plurality of fixing grooves P3 may be spaced apart from each other at predetermined distances along the longitudinal direction of the side plate 130.

In addition, the module mounting portion 121 may have a plurality of fixing protrusions 123 formed therein. The plurality of fixing protrusions 123 may be configured to prevent the side plate 130 from moving toward the battery module 110. Each of the plurality of fixing protrusions 123 may be configured such that a portion 123b is inserted into each of the plurality of fixing grooves P3. Also, the fixing protrusion 123 may be configured to support the outer surface of the side plate 130 so that another portion 123a prevents the side plate 130 from moving in an outward direction. For example, as shown in FIG. 11, a plurality of fixing protrusions 123 protruding upward may be formed on the module mounting portion 121 of the pack tray 120. A portion of the fixing protrusion 123 may have a more protruding shape than other portions to surround the outer surface (left surface) of the side plate 130.

Therefore, according to this configuration of the present disclosure, a plurality of fixing grooves P3 are formed at the lower end of the side plate 130 and the module mounting portion 121 has a plurality of fixing protrusions 123 configured to prevent the side plate 130 from moving in an outward direction, whereby the side plate 130 may be stably fixed on the module mounting portion 121. Moreover, the portion 123a may prevent the side plate 130 from moving in the left direction (negative direction of the X-axis) to block deformation of the battery module 110. Accordingly, the battery pack of the present disclosure may effectively increase durability.

Referring to FIGS. 10 to 12 along with FIG. 5 again, the plurality of fixing protrusions 123 of the battery pack 100 according to another embodiment of the present disclosure may be configured such that the thickness of the portion 123b configured to be inserted into the fixing groove P3 of the side plate 130 is gradually increased in the opposite direction to the battery module 110. For example, the fixing protrusion 123 may be formed to gradually increase in thickness in a direction opposite to a direction where the battery module 110 is located (negative direction of the X-axis in FIG. 10). That is, when the volume expansion of the battery module 110 occurs in a state where the fixing protrusion 123 is inserted into the fixing groove P3 formed at the lower end of the side plate 130, the side plate 130 may block the volume expansion of the battery module 110 with a stronger force as the swelling is intensified by the coupling structure of the fixing groove P3 and the fixing protrusion 123.

In other words, the shape in which the thickness of the fixing protrusion 123 gradually increases in an outward direction (negative direction of the X-axis) is the same as a wedge shape, and as the side plate 130 is pressed outward, the fixing protrusion 123 is tightly fitted into the fixing groove P3 of the side plate 130 to block the movement of the side plate 130 with a greater force. Moreover, a method of preventing the movement of the side plate 130 with a greater force as the movement of the side plate 130 increases while allowing the side plate 130 to move a predetermined distance, may have less fatigue accumulated in the side plate 130, compared to the method of completely restricting the movement of the side plate 130 such as the bolt fastening method. Accordingly, the side plate 130 in FIG. 10 has less fatigue accumulation than the side plate 130 in FIG. 5, thereby increasing mechanical durability, and thus is not broken or damaged even by relatively strong force of swelling, thereby effectively increasing the durability of the battery pack 100.

Figure 13:
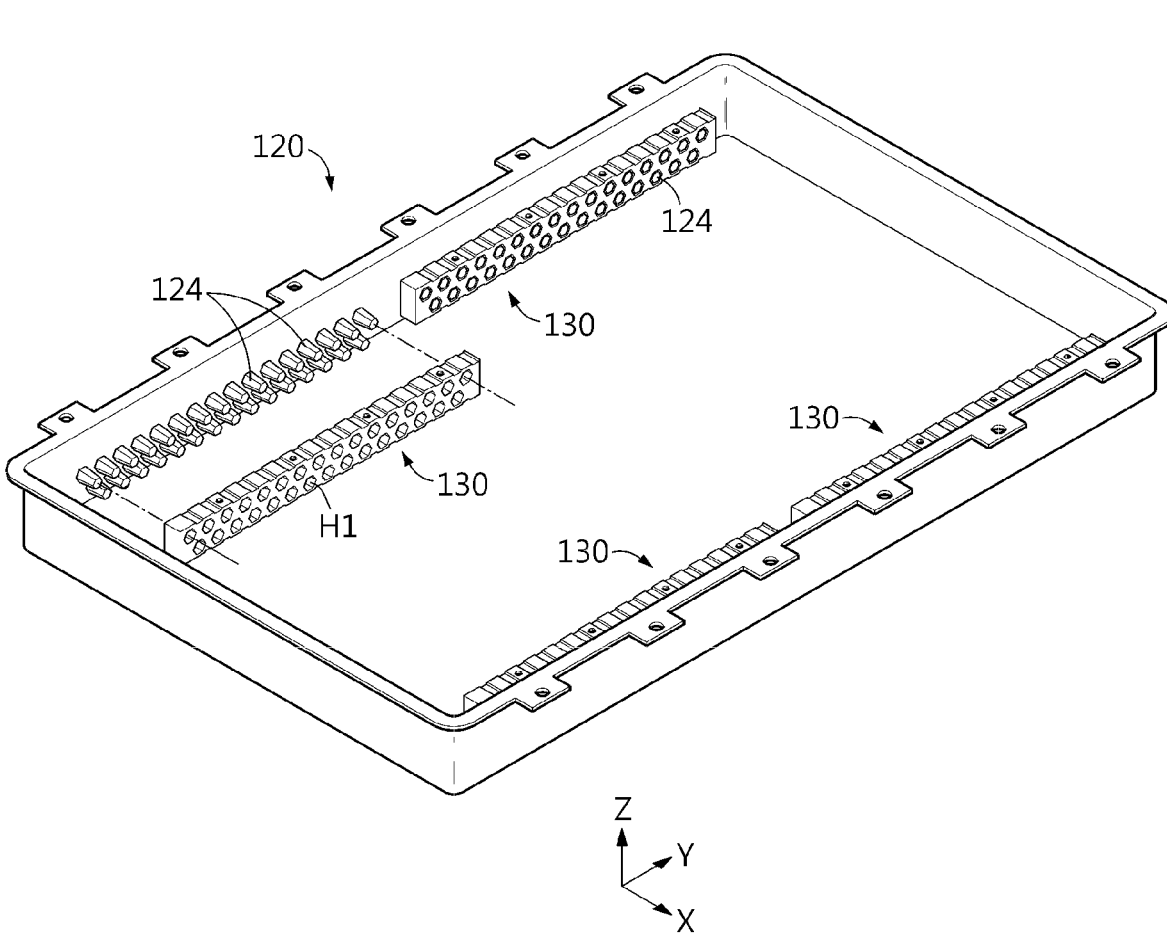
FIG. 13 is an exploded perspective view schematically showing a pack tray and side plates of a battery pack according to still another embodiment of the present disclosure.
Figure 14:
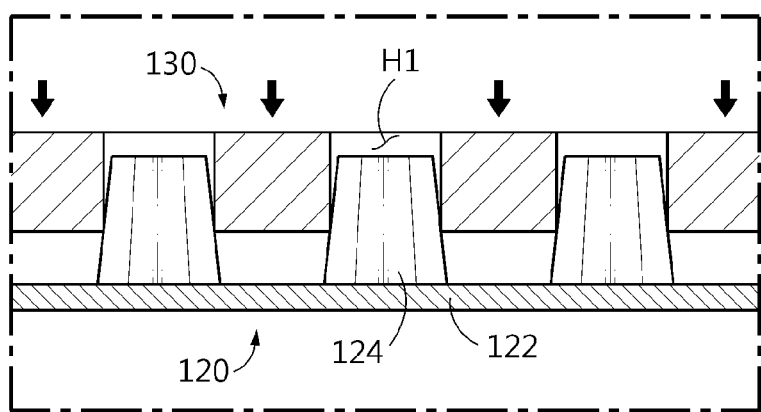
FIG. 14 is a partial cross-sectional view schematically showing a portion of a pack tray and a side plate of a battery pack according to still another embodiment of the present disclosure.

FIG. 13 is an exploded perspective view schematically showing a pack tray and side plates of a battery pack according to still another embodiment of the present disclosure. FIG. 14 is a partial cross-sectional view schematically showing a portion of a pack tray and a side plate of a battery pack according to still another embodiment of the present disclosure.

Referring to FIGS. 13 and 14 along with FIG. 5, the battery pack 100 according to still another embodiment of the present disclosure may further have a plurality of support protrusions 124 formed therein instead of the second bolt hole T2 of the pack tray 120 when compared with the battery pack 100 in FIG. 5. The other configurations of the battery pack 100 in FIG. 13 are the same as those of the battery pack 100 in FIG. 5, and thus description of the other configurations will be omitted.

In the battery pack 100 in FIG. 13, a plurality of support protrusions 124 may be formed in the pack tray 120. The plurality of support protrusions 124 may be configured to support the side plate 130 toward the battery module 110. Each of the plurality of support protrusions 124 may be formed at a position facing the plurality of through-holes H1 to be inserted into the plurality of through-holes H1 formed in the side plate 130. The plurality of support protrusions 124 may protrude toward the side plate 130. The support protrusion 124 may have a shape extending long in a horizontal direction (X-axis direction). The support protrusion 124 may have a hexagonal pillar shape.

In addition, the plurality of support protrusions 124 may be configured to block the movement of the side plate 130 with a greater force as the movement of the side plate 130 increases. The support protrusion 124 may have a shape in which the thickness thereof gradually increases in the opposite direction to the battery module 110. That is, the support protrusion 124 may be formed such that the closer to the protruding end, the smaller the thickness of the protrusion is. That is, the support protrusion 124 may have a horizontal cross-sectional area with a trapezoidal shape.

Therefore, according to this configuration of the present disclosure, the present disclosure has a plurality of support protrusions 124 formed in the pack tray 120, in which the plurality of support protrusions 124 are configured to be inserted into a plurality of through-holes H1 formed in the side plate 130, and thus it is possible to effectively prevent the side plate 130 from moving in an outward direction by the male and female coupling structure of the through-hole H1 and the support protrusion 124 when the volume expansion of the battery module 110 occurs, thereby suppressing the volume expansion of the battery module 110.

In addition, the plurality of support protrusions 124 have a shape in which the thickness thereof gradually increases in an outward direction (swelling direction), and like a coupling structure in which a wedge is embedded in a groove, the more the side plate 130 is pressed outward, the tighter the support protrusion 124 is fitted into the through-hole H1 of the side plate 130, thereby blocking the movement of the side plate 130 with a greater force.

Moreover, a method of preventing the movement of the side plate 130 with a greater force as the movement of the side plate 130 increases while allowing the side plate 130 to move a predetermined distance, may have less fatigue accumulated in the side plate 130 when compared with the method of completely restricting the movement of the side plate 130 such as the bolt fastening method. Accordingly, the side plate 130 in FIG. 13 has less fatigue accumulation than the side plate 130 in FIG. 5, thereby increasing mechanical durability, and thus is not broken or damaged even by relatively strong force of swelling, thereby effectively increasing the durability of the battery pack 100.

Moreover, the battery pack 100 may further include a BMS module (not shown) configured to control charge/discharge of the plurality of battery cells. Meanwhile, an energy storage system (not shown) according to an embodiment of the present disclosure includes at least one of the above-described battery packs 100. Here, the energy storage system may include a rack case in which the plurality of battery packs 100 are mounted.

Figure 15:
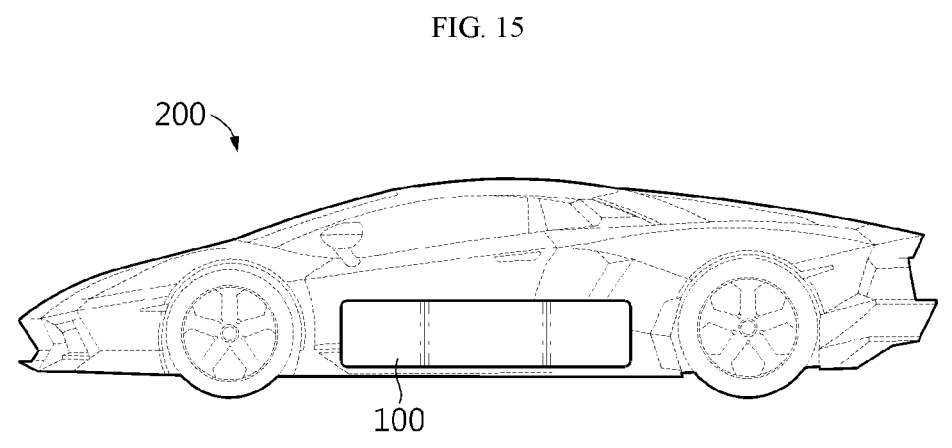

FIG. 15 is a side view schematically showing a vehicle according to an embodiment of the present disclosure.

Referring to FIG. 15, a vehicle 200 according to an embodiment of the present disclosure includes at least one of the above-described battery packs 100. The vehicle may further include a mounting portion having a storage space for accommodating the plurality of battery packs 100. For example, the battery pack 100 may be mounted on a vehicle body. For example, the vehicle generates a moving force by supplying power of the battery pack 100 to the electric motor, and may refer to any device that moves using the moving force. For example, the vehicle may be an electric vehicle, an electric bike, an electric bicycle, or an electric kickboard.

Meanwhile, the terms indicating directions as used herein such as upper, lower, left, right, front and rear are used for convenience of description only, and it is obvious to those skilled in the art that the term may change depending on the position of the stated element or an observer.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

REFERENCE SIGNS

100: battery pack
10, 110: battery module
11: battery cell
20: battery case

120: pack tray
121, 122: module mounting portion, side cover portion
130: side plate
H1: through-hole
140: upper cover
150: cross beam
G1, G2: first fastening groove, second fastening groove
T1, T2: first bolt hole, second bolt hole
P3: fixing groove
123: fixing protrusion
124: support protrusion

What is claimed is:

1. A battery pack comprising:
   at least one battery module having a plurality of battery cells;
   a pack tray having a module mounting portion configured to mount the at least one battery module and extending in a horizontal direction, and a side cover portion extending upwardly from an outer periphery of the module mounting portion to cover a side of the at least one battery module; and
   at least one side plate coupled to at least one of the module mounting portion and the side cover portion, provided on at least one side of the at least one battery module, having a plurality of through-holes, and configured to block at least one surface of the at least one battery module when the at least one battery module is expanded.

2. The battery pack according to claim 1, wherein the at least one battery module further comprises an upper cover extending in the horizontal direction to cover an upper portion of the at least one battery module and configured to be partially coupled to an upper end of the at least one side plate, and
   wherein a lower portion of the at least one side plate is coupled to the module mounting portion.

3. The battery pack according to claim 2, wherein a plurality of first fastening grooves and a plurality of first bolt holes formed at positions facing each other are formed in the at least one side plate and the upper cover, respectively.

4. The battery pack according to claim 2, wherein a lower end of the at least one side plate has a plurality of second fastening grooves inserted into a predetermined depth, and the module mounting portion has a plurality of second bolt holes formed at positions facing the plurality of second fastening grooves.

5. The battery pack according to claim 2, wherein a lower end of the at least one side plate has a plurality of fixing grooves extending upwardly a predetermined depth, and the module mounting portion has a plurality of fixing protrusions that extend into a respective one of the plurality of fixing grooves and are configured to prevent the at least one side plate from moving toward the at least one battery module.

6. The battery pack according to claim 5, wherein the plurality of fixing protrusions are configured such that the thickness thereof gradually increases in a direction extending away from the at least one battery module.

7. The battery pack according to claim 1, wherein the pack tray comprises a plurality of support protrusions respectively inserted into the plurality of through-holes formed in the at least one side plate and configured to support the at least one side plate toward the at least one battery module.

8. The battery pack according to claim 7, wherein each of the plurality of support protrusions gradually increases in thickness in a direction extending away from the at least one battery module.

9. The battery pack according to claim 1, wherein a cross section of each of the plurality of through holes has a honeycomb shape.

10. A vehicle comprising at least one battery pack according to claim 1.

11. An energy storage system comprising at least one battery pack according to claim 1.

* * * * *